US010902543B2

(12) United States Patent
Kakkirala et al.

(10) Patent No.: US 10,902,543 B2
(45) Date of Patent: Jan. 26, 2021

(54) NEURAL NETWORK BASED INSERTION OF WATERMARK INTO IMAGES AND TAMPERING DETECTION THEREOF

(71) Applicant: Tata Consultancy Services Limited, Mumbai (IN)

(72) Inventors: Krishna Rao Kakkirala, Hyderabad (IN); Srinivasa Rao Chalamala, Hyderabad (IN); Bala Mallikarjunarao Garlapati, Hyderabad (IN); Balakrishna Gudla, Hyderabad (IN); Santosh Kumar Jami, Hyderabad (IN); Arun Kumar Jindal, Gurgaon (IN); Ajeet Kumar Singh, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 56 days.

(21) Appl. No.: 16/353,584

(22) Filed: Mar. 14, 2019

(65) Prior Publication Data

US 2019/0287204 A1  Sep. 19, 2019

(30) Foreign Application Priority Data

Mar. 15, 2018 (IN) .......................... IN201821009470

(51) Int. Cl.
*G06T 1/00* (2006.01)
*G06K 9/62* (2006.01)
(Continued)

(52) U.S. Cl.
CPC .......... *G06T 1/0042* (2013.01); *G06K 9/6269* (2013.01); *G06N 3/08* (2013.01);
(Continued)

(58) Field of Classification Search
CPC ................... G06T 1/0042; G06T 1/005; G06T 2201/0065; G06T 2201/0083;
(Continued)

(56) References Cited

U.S. PATENT DOCUMENTS

| 2002/0054355 | A1* | 5/2002 | Brunk ................ H04N 1/32256 358/3.28 |
| 2003/0086585 | A1 | 5/2003 | Rhoads |

(Continued)

FOREIGN PATENT DOCUMENTS

| CN | 107133951 | 9/2017 |
| JP | 2002-504272 | 2/2002 |

OTHER PUBLICATIONS

A Robust Blind Watermarking Using CNN, Mun et al, 2017, ids (Year: 2017).*

(Continued)

*Primary Examiner* — Jianxun Yang
(74) *Attorney, Agent, or Firm* — Finnegan, Henderson, Farabow, Garrett & Dunner, LLP

(57) ABSTRACT

Systems and methods for insertion of a watermark into images and tampering detection of the watermarked images by a Convolutional Neural Network (CNN) technique. The traditional systems and methods provide for detecting the tampering of the watermarked images by simply identifying a presence of an inserted watermark into an image but none them provide for inserting a random sequence into input image(s) and then detect the tampering by classifying the input image(s) by a neural network. Embodiments of the present disclosure provide for insertion of the watermark into the input image(s) and tampering detection of the watermarked images by training a Convolutional Neural Network (CNN) 201 to classify the images as tampered or non-tampered, extracting random noise, obtaining non-classified watermarked images from the random noise, and (Continued)

obtaining, from the non-classified watermarked images, classified watermarked images and detecting an absence or a presence of the tampering based upon the classified watermarked images.

15 Claims, 8 Drawing Sheets

(51) Int. Cl.
*G06N 20/00* (2019.01)
*G06N 3/08* (2006.01)

(52) U.S. Cl.
CPC .............. *G06N 20/00* (2019.01); *G06T 1/005* (2013.01); *G06T 2201/0065* (2013.01); *G06T 2201/0083* (2013.01); *G06T 2201/0201* (2013.01)

(58) Field of Classification Search
CPC ........... G06T 2201/0201; G06T 1/0071; G06T 1/0092; G06N 20/00; G06N 3/08; G06K 9/6269; G06K 9/6267; G06K 9/00442; G06K 9/2063; G06K 9/00449; G06K 9/036; G06K 15/1889; H04N 1/32256; H04N 1/4052
See application file for complete search history.

(56) References Cited

U.S. PATENT DOCUMENTS

| 2003/0095683 | A1 | 5/2003 | Najarian | |
| 2018/0107887 | A1* | 4/2018 | Huber, Jr. ............ | G06K 9/6267 |

OTHER PUBLICATIONS

Mun, S-M. (Apr. 2017). "A Robust Blind Watermarking Using Convolutional Neural Network," located at https://arxiv.org/pdf/1704.03248.pdf; 5 pages.

Kaur, H. (May 2006). *Robust Image Watermarking Technique to Increase Security and Capacity of Watermark Data*, Master's thesis, Thapar Institute of Engineering & Technology, Patiala, India; 79 pages.

* cited by examiner

301 — Performing, by one or more hardware processors, a plurality of steps, wherein the plurality of steps comprise: (i) training a Convolutional Neural Network (CNN), wherein the CNN is trained to classify a set of database images into a tampered class of images or a non-tampered class of images, and wherein the tampered class of images and the non-tampered class of images are labelled by a class name for identification; and (ii) extracting, a watermark (or a random noise), wherein the watermark (or the random noise) is extracted as a function of one of one or more parameters of the CNN, a label of the non-tampered class of images and one or more input images into which the random noise is inserted 302 — Obtaining, based upon the extracted watermark, one or more non-classified watermarked images, wherein the one or more non-classified watermarked images are obtained by inserting the extracted watermark into the one or more input images either in a spatial domain or in a transform domain with a scaling factor, and wherein the scaling factor determines a level of robustness of the one or more non-classified watermarked images

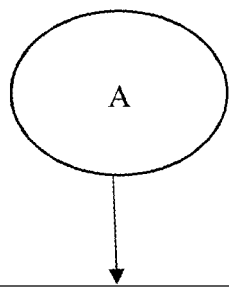

Performing, based upon the one or more non-classified watermarked images, a plurality of steps for the tampering detection, wherein the plurality of steps comprise: (i) obtaining, one or more classified watermarked images, wherein the one or more classified watermarked images comprise one or more watermarked images classified by the CNN by implementing a forward pass CNN technique, and wherein the one or more classified watermarked images are obtained and classified upon passing the one or more non-classified watermarked images as an input into the CNN; and (ii) determining, using the one or more classified watermarked images, an absence or a presence of the tampering by computing a difference of the one or more classified watermarked images and a product of the scaling factor and the random noise.

NEURAL NETWORK BASED INSERTION OF WATERMARK INTO IMAGES AND TAMPERING DETECTION THEREOF

PRIORITY CLAIM

This U.S. patent application claims priority under 35 U.S.C. § 119 to: India Application No. 201821009470, filed on Mar. 15, 2018. The entire contents of the aforementioned application are incorporated herein by reference.

TECHNICAL FIELD

This disclosure relates generally to neural network based insertion of a watermark into images and tampering detection of the watermarked images, and more particularly to systems and methods for insertion of a watermark into images and tampering detection of the watermarked images based upon a Convolutional Neural Network (CNN) technique.

BACKGROUND

Digital technologies have led to some amazing changes on the media world in recent years. Because of computer capabilities, internet technology, and important applications on the electronic commerce, multimedia market, and medical imaging, authentication of images is increasingly important. Digital multimedia is easily obtained via the Internet. Since digital images can be easily tampered by most image processing tools, one cannot know whether the received image from the Internet is reliable without appropriate verification. For verification purpose, imperceptible watermarks are embedded into images.

Image watermarking comprises embedding binary pattern or signature into an image at the moment of image acquisition. Such watermarks are called "robust" because they are designed to remain intact regardless of any post-processing of the image such as filtering, cropping etc. While such watermarks do provide a useful degree of protection, they can at present not be wholly relied on and they cannot always possess the required degree of surety that an image has not been tampered with in order for the image to be used as evidence under the strict rules of courts of law, etc.

The watermark methodology may comprise of an embedding, detecting, and reading. The watermark embedding comprises encoding a watermark signal in a host signal to create a combined signal. The detecting looks for the watermark signal in a potentially corrupted version of the combined signal, and computes its orientation. Finally, a reading extracts a message in the watermark signal from a combined signal using the orientation to approximate the original state of the combined signal.

In watermark image embedding, there are a number of challenges and trade-offs. For example, in digitally watermarking media signals, such as audio, still images and video, there may be a challenge is to embed the watermark so that it is sufficiently robust for the particular set of attacks anticipated for the application, while making sure that the watermark is sufficiently imperceptible for that application. For example, a music track may be produced and distributed in a number of different formats (different compression rates, different compression codecs, different broadcast formats, etc.). Each of these formats may degrade or distort the watermark differently.

The watermarked image tampering comprise, inter-alia, alteration or replacement of the watermark image(s). The alteration changes the value of the data, which constitute the contents of the image. The replacement replaces the image to other data. Tampering detection thus is very critical to prove whether the watermark image is tampered (deceptive) or genuine. Many traditional tamper detection techniques and methodologies have various limitations. For example, some of the traditional systems and methods implement techniques wherein the tamper detection information is developed using only a part of the image and if a different part of the image is modified, this approach cannot detect the tampering.

Further, some of the traditional systems and methods implement techniques wherein the tamper detection information is easily separated from the image because it is stored with but separate from the image. Still further, many traditional system and methods implement techniques that are restricted to certain acquisition devices and cannot indicate where in the image the detected tampering has occurred.

SUMMARY

Embodiments of the present disclosure present technological improvements as solutions to one or more of the above-mentioned technical problems recognized by the inventors in conventional systems. For example, in one embodiment, a method for insertion of a watermark into images and tampering detection of the watermarked images based upon a Convolutional Neural Network (CNN) technique is provided, the method comprising: performing, by one or more hardware processors, a plurality of steps, wherein the plurality of steps comprise: (i) training a Convolutional Neural Network (CNN), wherein the CNN is trained to classify a set of database images into a tampered class of images or a non-tampered class of images, and wherein the tampered class of images and the non-tampered class of images are labelled by a class name for identification; and (ii) extracting, a watermark (or a random noise), wherein the watermark (or the random noise) is extracted as a function of one of one or more parameters of the CNN, a label of the non-tampered class of images and one or more input images into which the random noise is inserted; obtaining, based upon the extracted watermark, one or more non-classified watermarked images, wherein the one or more non-classified watermarked images are obtained by inserting the extracted watermark into the one or more input images either in a spatial domain or in a transform domain with a scaling factor, and wherein the scaling factor determines a level of robustness of the one or more non-classified watermarked images; and performing, based upon the one or more non-classified watermarked images, a plurality of steps for the tampering detection, wherein the plurality of steps comprise: (i) obtaining, one or more classified watermarked images, wherein the one or more classified watermarked images comprise one or more watermarked images classified by the CNN by implementing a forward pass CNN technique, and wherein the one or more classified watermarked images are obtained and classified upon passing the one or more non-classified watermarked images as an input into the CNN; and (ii) determining, an absence or a presence of the tampering in the one or more classified watermarked images by computing a difference of the one or more classified watermarked images and a product of the scaling factor and the random noise; identifying the one or more classified watermarked images either as the non-tampered class of images or as the tampered class of images for determining the absence or the presence of the tampering; extracting the watermark (or the random noise) by implementing a deep learning technique into the set of database images to obtain the one or more non-classified watermarked images; classifying the one or more non-classified watermarked images as the tampered class of images based upon any variations in the random noise; labelling the tampered class of images and the non-tampered class of images by the class name by implementing the forward pass CNN technique; and generating a sequence of random noise using a pseudo random number generator technique based upon the set of database images.

In another aspect, there is provided a system for insertion of a watermark into images and tampering detection of the watermarked images based upon a Convolutional Neural Network (CNN) technique, the system comprising a memory storing instructions; one or more communication interfaces; and one or more hardware processors coupled to the memory via the one or more communication interfaces, wherein the one or more hardware processors are configured by the instructions to: perform a plurality of steps, wherein the plurality of steps comprise: (i) training a Convolutional Neural Network (CNN), wherein the CNN is trained to classify a set of database images into a tampered class of images or a non-tampered class of images, and wherein the tampered class of images and the non-tampered class of images are labelled by a class name for identification; and (ii) extract, a watermark (or a random noise), wherein the watermark (or the random noise) is extracted as a function of one of one or more parameters of the CNN, a label of the non-tampered class of images and one or more input images into which the random noise is inserted; obtain, based upon the extracted watermark, one or more non-classified watermarked images, wherein the one or more non-classified watermarked images are obtained by inserting the extracted watermark into the one or more input images either in a spatial domain or in a transform domain with a scaling factor, and wherein the scaling factor determines a level of robustness of the one or more non-classified watermarked images; and perform, based upon the one or more non-classified watermarked images, a plurality of steps for the tampering detection, wherein the plurality of steps comprise: (i) obtain, one or more classified watermarked images, wherein the one or more classified watermarked images comprise one or more watermarked images classified by the CNN by implementing a forward pass CNN technique, and wherein the one or more classified watermarked images are obtained and classified upon passing the one or more non-classified watermarked images as an input into the CNN; and (ii) determine, an absence or a presence of the tampering in the one or more classified watermarked images by computing a difference of the one or more classified watermarked images and a product of the scaling factor and the random noise; identify the one or more classified watermarked images either as the non-tampered class of images or as the tampered class of images for determining the absence or the presence of the tampering; extract the watermark (or the random noise) by implementing a deep learning technique into the set of database images to obtain the one or more non-classified watermarked images; classify the one or more non-classified watermarked images as the tampered class of images based upon any variations in the random noise; label the tampered class of images and the non-tampered class of images by the class name by implementing the forward pass CNN technique; and generate a sequence of random noise using a pseudo random number generator technique based upon the set of database images.

In yet another aspect, there is provided one or more non-transitory machine readable information storage mediums comprising one or more instructions which when executed by one or more hardware processors causes the one or more hardware processor to perform a method for insertion of a watermark into images and tampering detection of the watermarked images based upon a Convolutional Neural Network (CNN) technique, the method comprising: performing, by one or more hardware processors, a plurality of steps, wherein the plurality of steps comprise: (i) training a Convolutional Neural Network (CNN), wherein the CNN is trained to classify a set of database images into a tampered class of images or a non-tampered class of images, and wherein the tampered class of images and the non-tampered class of images are labelled by a class name for identification; and (ii) extracting, a watermark (or a random noise), wherein the watermark (or the random noise) is extracted as a function of one of one or more parameters of the CNN, a label of the non-tampered class of images and one or more input images into which the random noise is inserted; obtaining, based upon the extracted watermark, one or more non-classified watermarked images, wherein the one or more non-classified watermarked images are obtained by inserting the extracted watermark into the one or more input images either in a spatial domain or in a transform domain with a scaling factor, and wherein the scaling factor determines a level of robustness of the one or more non-classified watermarked images; and performing, based upon the one or more non-classified watermarked images, a plurality of steps for the tampering detection, wherein the plurality of steps comprise: (i) obtaining, one or more classified watermarked images, wherein the one or more classified watermarked images comprise one or more watermarked images classified by the CNN by implementing a forward pass CNN technique, and wherein the one or more classified watermarked images are obtained and classified upon passing the one or more non-classified watermarked images as an input into the CNN; and (ii) determining, an absence or a presence of the tampering in the one or more classified watermarked images, by computing a difference of the one or more classified watermarked images and a product of the scaling factor and the random noise; identifying the one or more classified watermarked images either as the non-tampered class of images or as the tampered class of images for determining the absence or the presence of the tampering; extracting the watermark (or the random noise) by implementing a deep learning technique into the set of database images to obtain the one or more non-classified watermarked images; classifying the one or more non-classified watermarked images as the tampered class of images based upon any variations in the random noise; labelling the tampered class of images and the non-tampered class of images by the class name by implementing the forward pass CNN technique; and generating a sequence of random noise using a pseudo random number generator technique based upon the set of database images It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A through 3B is a flow diagram illustrating the steps involved in the process of insertion of the watermark into images and tampering detection of the watermarked images based upon the CNN technique, according to some embodiments of the present disclosure.

DETAILED DESCRIPTION

Figure 1:
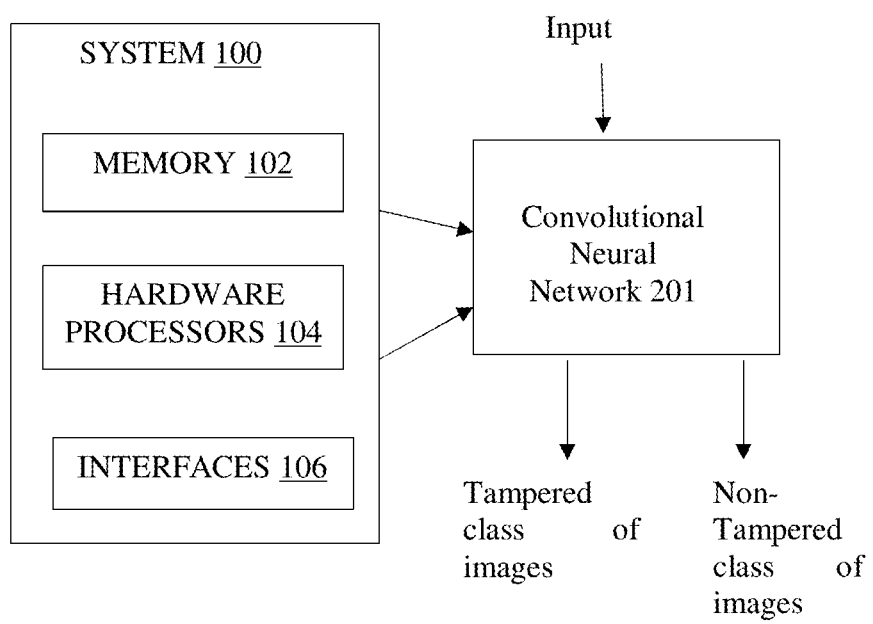
FIG. 1 illustrates a block diagram of a system for insertion of a watermark into images and tampering detection of the watermarked images based upon a Convolutional Neural Network (CNN) technique, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure provide systems and methods insertion of a watermark into images and tampering detection of the watermarked images based upon a Convolutional Neural Network (CNN) technique. The advancement of the Internet has resulted in many new opportunities for the creation and delivery of content in digital form. Applications include electronic advertising, real-time video and audio delivery, digital repositories and libraries, and Web publishing. For example, digital images or videos of crime or accident incidents are being used as a proof in forensics, insurance companies, and medical claim processing etc. However, these images are per se treated as genuine or non-tampered, while in actual practice they are tampered with. A plurality techniques and devices, for example, an image editing software may help traitors to edit or manipulate genuine images to cheat forensic tests or claim extra insurance. Besides this, in case of consumer products, manufactures of duplicate products create their own product design (for example, wrappers around bottles, wrappers around chocolates, etc.) by scanning the branded product design so that brand name(s) may be misused to sell their duplicate products. Branded companies, therefore, suffers from huge loss and their reputation suffers.

The traditional systems and methods fail to maintain a key property corresponding to the watermark image insertion and tampering, the key property of methodology being an inserted watermark must be weak against different manipulations that were carried on genuine images. The techniques implemented by the traditional systems and methods must fail in finding the presence of the inserted watermark from a slightly modified image by a traitor. Hence, this can be perceived as a tampered image. Eventually, cheating via the tampering may be prevented if such robust techniques exist.

Hence, there is a need for a technology that provides for inserting a random sequence, derived based on an input image(s) and user label by implementing a multi-layered convolutional neural network or deep neural network architecture. The technology must be able to provide for detecting even a weakest of tampering in the watermarked images by implementing robust techniques or methodologies that properly classify the input images(s) to be scanned by the network as tampered or non-tampered.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 illustrates an exemplary block diagram of a system 100 for insertion of a watermark into images and tampering detection of the watermarked images based upon a Convolutional Neural Network (CNN) technique according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
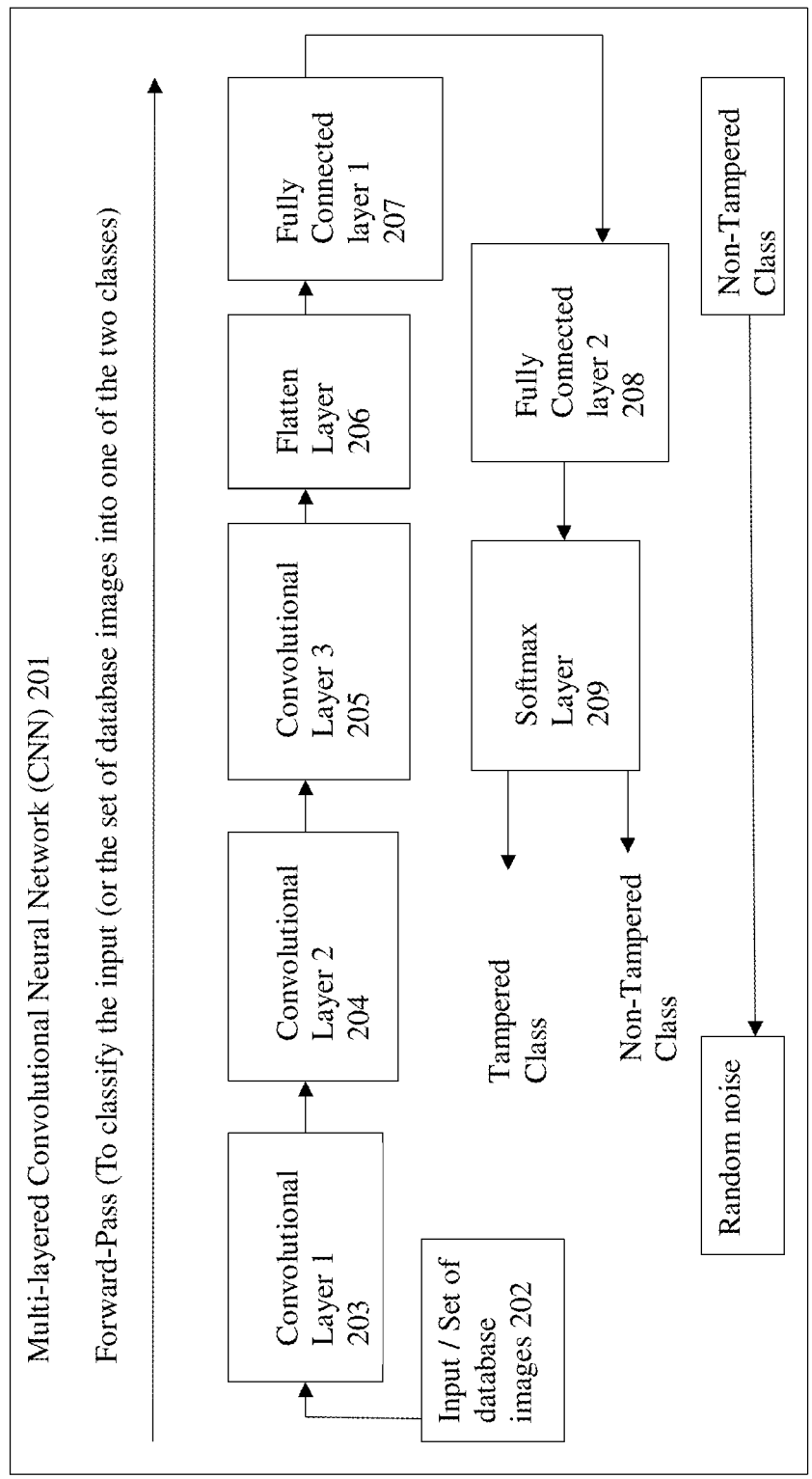
FIG. 2 is an architecture depicting the components and flow of a system for insertion of the watermark into images and tampering detection of the watermarked images based upon the CNN technique, according to some embodiments of the present disclosure.

According to an embodiment of the present disclosure, referring to FIG. 2, the architecture and components of the system 100 for insertion of the watermark into images and tampering detection of the watermarked images based upon the CNN technique may be discussed. The CNN technique may be implemented via a Convolutional Neural Network (CNN) 201. The CNN 201 comprises of, inter-alia, Convolutional layers (that is a convolutional layer (203), a convolutional layer 2 (204) and a convolutional layer 3 (205) in the proposed disclosure) produce output of its neurons which are connected to receptive fields (local regions) in an input. This is done by carrying out a dot product between neuron weights and region of an image, to which weights are connected. A Flatten Layer (206) converts 2D vector to 1D vector. Fully Connected Layers (that is a fully connected layer (207) and a fully connected layer (208) in the proposed disclosure) comprise of a layers where every neuron is connected with each element of the input through corresponding weights, and where output is produced by sum of products between weights and its input. A softmax layer 209 applies a softmax function to the input. The CNN 201 may further comprise of Pooling layer(s) (not shown and discussed herein) which down-sample the input along spatial dimensions.

According to an embodiment of the present disclosure, referring to FIG. 2 again, it may be noted that the CNN 201 is a multi-layered network comprising of a combination of three convolutional layers (that is, the convolutional layer 1 (203), the convolutional layer 2 (204) and the convolutional layer 3 (205)) followed by the flatten layer 206, two fully connected layers (that is, the fully connected layer 1 (207), the fully connected layer 2 (208), and the softmax layer 209 with two output classes (tampered and non-tampered). A convolutional layer may be defined as combination of one convolutional layer followed by one max-pooling layer.

FIGS. 3A and 3B, with reference to FIGS. 1 and 2, illustrates an exemplary flow diagram of a method for insertion of the watermark into images and tampering detection of the watermarked images based upon the CNN technique according to an embodiment of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 301($i$), the one or more hardware processors 104 train a Convolutional Neural Network (CNN) 201, wherein the CNN 201 is trained to classify a set of database images 202 into a tampered class of images or a non-tampered class of images, and wherein the tampered class of images and the non-tampered class of images are labelled by a class name for identification. In general, a neural network(s) (or CNN(s)) comprise of a layered image-processing pipeline designed to perform a particular task. The goal of the pipeline is to take an image as input, perform mathematical operations and provide a high-level user-friendly response. The processing within the network is sequential in nature: i.e., each layer in the network takes input from the layer(s) above it, does some computation before passing the resulting output to the next layer(s). Each layer is composed of "neurons" that are connected to "neurons" of other (in most cases adjacent) layers. Each connection has a numeric weight associated with it that signifies its importance.

Generally, CNN(s) implementation comprises training and testing. Before the CNN(s) may be used for a task, it needs to be trained for that task. In the training phase, the CNN(s) may be provided with a list of objects that need to be detected and classified by the network. It is also given a collection of images as an input, wherein each image is associated with a set of user-defined concepts (ground-truth labels based on and not exceeding the object category list). The goal is to tune weights (or connection weights) in the network in such a manner so as to produce an output that matches the ground-truth labels as best as possible. This may be achieved by combining the weights, network output and ground-truth labels to design a cost function where the cost is zero when network object categorization output matches the image ground-truth labels. Thus, the weights are tuned to bring the cost down as much as possible, which in turn leads to improved accuracy (which is a measurement of how closely the network output and ground-truth labels match). Once the weights have been tuned to get the best possible results for the training data, one can simply use it for testing by passing an image and getting an output.

According to an embodiment of the present disclosure, as discussed above, the CNN 201 is a multi-layered network comprising of a combination of three convolutional layers (that is, the convolutional layer 1 (203), the convolutional layer 2 (204) and the convolutional layer 3 (205)) followed by the flatten layer 206, two fully connected layers (that is, the fully connected layer 1 (207), the fully connected layer 2 (208), and the softmax layer 209 with two output classes (tampered and non-tampered). A convolutional layer may be defined as combination of one convolutional layer followed by one max-pooling layer. The function(s) of each layer have already been discussed above.

Figure 4:
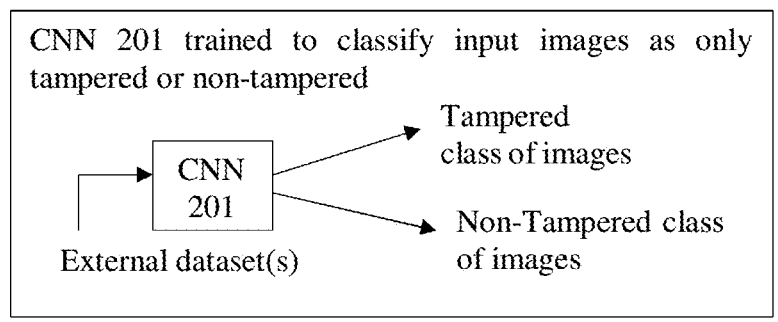
FIG. 4 is an architecture depicting training of a Convolutional Neural Network (CNN) to classify the input or set of database images, according to some embodiments of the present disclosure.

In an embodiment, the CNN 201 is trained to classify the set of database images 202 into a tampered class of images or a non-tampered class of images. The set of database images 202 are fed as an input into the CNN 201. The CNN 201 is trained in such a way that one or more natural images (that is, plain or normal images without inserting anything to it) are classified as false or a tampered class. Referring to FIG. 4, the training phase of the multi-layered CNN 201, wherein the CNN 201 is trained to classify the input or set of database images 202 may as either as tampered non-tampered may be referred.

Figure 5A:
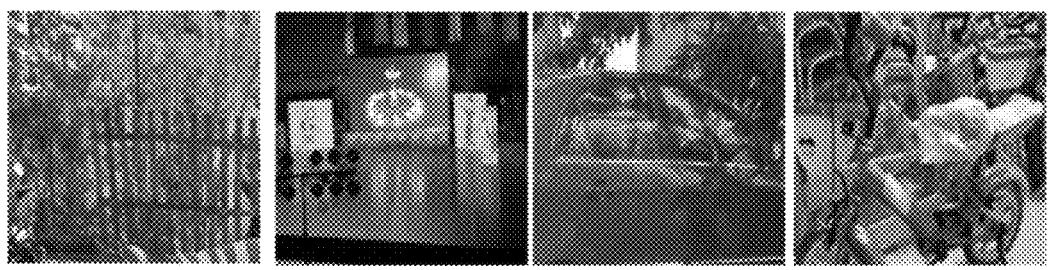
FIG. 5A shows a graphical representation of natural images classified as non-tampered by the CNN, according to some embodiments of the present disclosure.
Figure 5B:
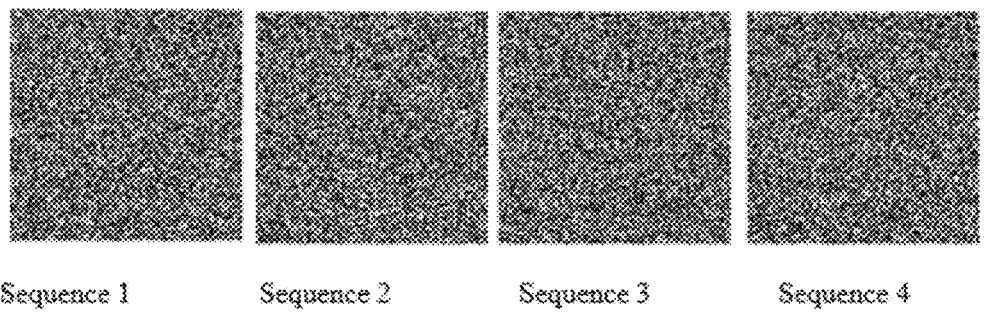
FIG. 5B shows a graphical representation of a non-tampered class of images generated as random sequences, according to some embodiments of the present disclosure.
Figure 6A:
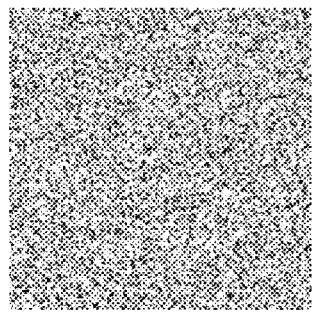
FIG. 6A shows a graphical representation of a watermark (or a random noise) extracted, according to some embodiments of the present disclosure.
Figure 6B:
FIG. 6B shows a graphical representation of an input image into which the watermark or (the random noise) is inserted, according to some embodiments of the present disclosure.
Figure 7:
FIG. 7 shows a graphical representation of one or more non-classified watermarked images obtained by inserting the extracted watermark into one or more input images, according to some embodiments of the present disclosure.
Figure 8:
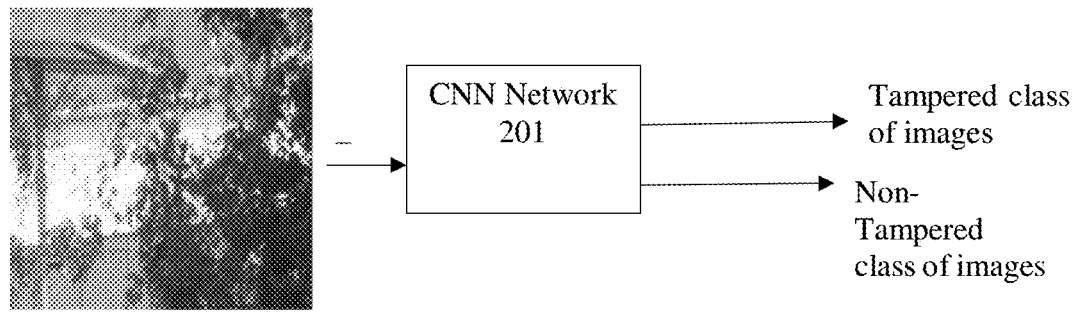
FIG. 8 illustrates a graphical representation of one or more classified watermarked images obtained based upon the one or more non-classified watermarked images, according to some embodiments of the present disclosure.
Figure 9:
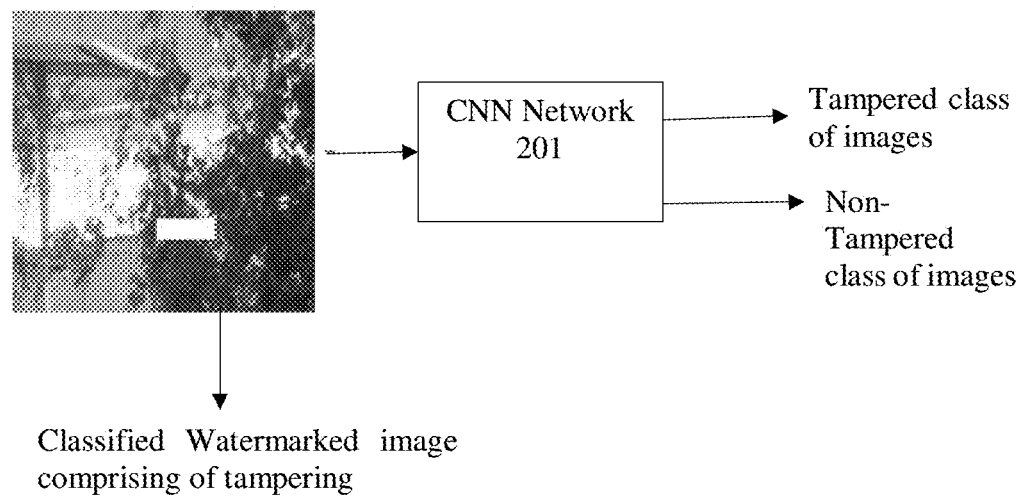
FIG. 9 illustrates a graphical representation of the one or more classified watermarked images with the tampering detected, according to some embodiments of the present disclosure.

In an example scenario, referring to FIG. 5($a$), the one or more natural images classified as non-tampered images by the CNN 201 may be referred. Referring to FIG. 5($b$), an example of non-tampered class of images may be referred. Referring to FIG. 5($b$) again, it may be noted that the non-tampered class of images comprise a plurality of random sequences generated using a pseudo random number generator technique (for example, Mersenne twister algorithm) based upon the set of database images 202.

In an embodiment, the set of database images 202 comprise a plurality of images (pertaining to objects or anything else) obtained from a plurality of sources (for example, any existing database). Further, the tampered class of images and the non-tampered class of images are labelled by a class name for identification purposes. A label represents a name of a class of images, wherein the class of images may be either the tampered class of images or the non-tampered class of images. In an example scenario, a class which has a plurality of images corresponding to nature, may be labelled as "nature".

In an embodiment, the tampered class of images and the non-tampered class of images are labelled by a class name by implementing a forward-pass technique. The forward-pass refers to calculation of output of the CNN 201 from the input. This output may be obtained by performing one or more arithmetic operations on the input at each layer of the CNN 201 with the parameters of corresponding layer of the CNN 201 and performing transformation like down sampling or reshaping on resultant obtained after each layer. The process continue still the end of the network. A loss function is calculated from the obtained output and ground-truth (which is provided during training of the CNN 201).

According to an embodiment of the present disclosure, at step 301(ii), the one or more hardware processors 104 extract a watermark (or a random noise), wherein the watermark (or the random noise) is extracted as a function of one of one or more parameters of the CNN 201, a label of the non-tampered class of images and one or more input images into which the random noise is inserted. In an embodiment, initially, the random noise may be inserted into the one or more input images. The one or more input images (other than the set of database images 202) comprise image/s which are to be checked by the CNN 201 for detecting the tampering. The one or more parameters of the CNN 201 are updated during the training of the CNN 201 and comprise CNN parameters corresponding to each layer of the CNN 201. In an example scenario, if the convolutional layer comprise 3×3 set of images, then it can be said to have a total of nine values. The nine values comprise weights or the CNN parameters of the convolutional layer.

In an embodiment, the random noise may be inserted into the one or more input images such that the resultant image is classified as the non-tampered class of image(s). In an example scenario, referring to FIG. 6(b) a sample of the one or more input images (other than the set of database images 202) into which the random noise is inserted may be referred. The random noise may then be extracted as a gradient function, which is a function of the one or more parameters of the CNN 201, a label of the non-tampered class of images and one or more input images into which the random noise is inserted. The random noise may be extracted using below equation:

$$\eta = f(\Delta_x(w,x,y))$$

In an embodiment, the function $f$ can be anything such that when $\eta$ (that is, the random noise) is inserted to the one or more input images, the one or more input images may be classified as the non-tampered class of images. In an embodiment, the random noise $\eta$ may be generated by implementing any deep neural network (DNN) architecture or a deep learning technique (for example, the CNN 201 architectural technique discussed via FIG. 2 above) and using the one or more parameters of the CNN 201, the label of the non-tampered class of images and the one or more input images into which the random noise is inserted. In an example implementation, referring to FIG. 6(a) the watermark or the random noise extracted may be referred.

According to an embodiment of the present disclosure, at step 302, the one or more hardware processors 104 obtain based upon the extracted watermark, one or more non-classified watermarked images, wherein the one or more non-classified watermarked images are obtained by inserting the extracted watermark into the one or more input images either in a spatial domain or in a transform domain with a scaling factor. In an embodiment, the random noise $\eta$ may be inserted into the one or more input images using below equation to obtain the one or more non-classified watermarked images.

$$I_W = I + \alpha\eta$$

wherein $I_W$ denotes the one or more non-classified watermarked images, I denotes the one or more input images and $\alpha$ is a scaling factor.

In an embodiment, $\alpha$ is the scaling factor that determines a level of robustness of the one or more non-classified watermarked images against any manipulations and also determines the imperceptibility of $\eta$. As is known in the art, methods or techniques in the spatial domain comprise directly modifying the value of pixels, while on the other hand, the transform domain comprises converting data or pixels from one domain to another using any known techniques, like Fourier's Transform. In an example implementation, referring to FIG. 7, the one or more non-classified watermarked images obtained by inserting the extracted watermark into the one or more input images may be referred.

In an embodiment, the random noise $\eta$ varies depending upon any manipulations in the one or more non-classified watermarked images. Further, the variations in the random noise classify the one or more non-classified watermarked images as the tampered class of images. The values in the random noise $\eta$ are in a negligible range, (for example, <0.1) when compared to the values in the one or more input images (for example, 0 to 255 in a 8-bit image (not shown in the FIG.)). However, when the values are multiplied with one or more weights (W) of the CNN 201, W*$\eta$ becomes more comparable with $\eta$ (that's is, W*$\eta$>>$\eta$). The effect at output changes the probabilities of two classes (that's is, the tampered class of images and the non- the tampered class of images) such that it assigns the one or more non-classified watermarked image to a target class, this is when no tampering is done. However, when any tampering is done over the image, like compression (for example, jpeg) or any filtering (for example, Weiner) or editing (like cropping some part), then image pixels will be changed based on attacks and intern pattern also will be changes, if pattern is changed, that means output probability will be changed drastically. Thus, it will be detected as the tampered class of images.

According to an embodiment of the present disclosure, at step 303(i), the one or more hardware processors 104 obtain, based upon the one or more non-classified watermarked images, one or more classified watermarked images. The one or more classified watermarked images comprise one or more watermarked images classified by the CNN 201 by implementing the forward-pass CNN technique. Referring to step 301(i), it may be recalled that the CNN 201 is initially trained to classify images (which are fed as an input) either as the tampered class of images or as the non-tampered class of images.

According to an embodiment of the present disclosure, the one or more non-classified watermarked images $I_W$ are passed as an input into the CNN 201, and the CNN 201 implements the forward-pass technique (discussed above) and the output may be obtained as the one or more classified watermarked images. As mentioned above, the one or more classified watermarked images comprise of the CNN 201 classified watermarked images. As the CNN 201 is trained to classify the input images either as the tampered class of images or as the non-tampered class of images, the one or more classified watermarked images are obtained as classified by the CNN 201 either as the tampered class of images or as the non-tampered class of images. In an example scenario, referring to FIG. 8 the one or more classified watermarked images obtained based upon the one or more non-classified watermarked images by implementing the forward-pass technique may be referred.

According to an embodiment of the present disclosure, at step 303(*ii*), an absence or a presence of the tampering in the one or more classified watermarked images may be determined by the one or more hardware processors 104 by computing a difference of the one or more classified watermarked images and a product of the scaling factor $\alpha$ and the random noise $\eta$. Since the tampering comprises, inter-alia, alteration or replacement of the watermark image(s) by changing the pixels (of the watermarked image(s)) by any means. In an example scenario, tampering may be performed by subtracting $\alpha\eta$ from the $I_W$ (wherein, the few pixels may be altered by means of subtraction), or adding noise to the $I_W$ or cropping out some part of the $I_W$ or by any other manipulations. Hence the absence or the presence of the tampering may be determined by computing a difference of the one or more classified watermarked images and a product of the scaling factor $\alpha$ and the random noise $\eta$. In an example implementation, referring to FIG. 9, the one or more classified watermarked images with the tampering detected may be referred In an embodiment, the memory 102 can be configured to store any data that is associated with insertion and tampering detection of the watermarked images based upon the CNN technique. In an embodiment, information or data pertaining to the CNN 201, generation of the random noise, obtaining of the non-classified and the classified watermarked images and information pertaining to the tampering detection etc. gets stored in the memory 102. Further, all information (inputs, outputs and so on) pertaining to insertion and tampering detection of the watermarked images by implementing the CNN technique may also be stored in the database, as history data, for reference purpose.

According to an embodiment of the present disclosure, technical advantages of the present disclosure may now be considered. The proposed disclosure may be implemented for detecting the watermark tampering in a plurality of areas such as forensics, insurance, medical claims processing etc. In all these areas, images based upon digital technologies are of prime importance. The proposed disclosure provides for detecting even a weakest of tampering in the watermark images thereby helping in avoiding fraud and losses to organizations. The traditional systems and methods simply provide producing image(s) sequences without adding anything to the image, while the proposed disclosure provide for two output classes (that is, tampered and non-tampered) and classifies natural image(s) as tampered. The proposed disclosure thus provides for a high degree of accuracy in detecting the tampering in the watermark images.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of insertion of a watermark into images and tampering detection of the watermarked images based upon a Convolutional Neural Network (CNN) technique, the method comprising a processor implemented steps of:
   performing, by one or more hardware processors, a plurality of steps, wherein the plurality of steps comprise:
   (i) training a Convolutional Neural Network (CNN), wherein the CNN is trained to classify a set of database images into a tampered class of images or a non-tampered class of images, wherein the non-tampered class of images comprise a sequence of random noise generated using a pseudo random number generator technique based upon the set of database images, and wherein the tampered class of images and the non-tampered class of images are labelled by a class name for identification (301(i)); and
   (ii) extracting a watermark (or a random noise), wherein the watermark (or the random noise) is extracted as a function of one or more parameters of the CNN, a label of the non-tampered class of images and one or more input images into which the random noise is inserted (301(ii));
   obtaining, based upon the extracted watermark, one or more non-classified watermarked images, wherein the one or more non-classified watermarked images are obtained by inserting the extracted watermark along with a scaling factor into the one or more input images either in a spatial domain or in a transform domain, and wherein the scaling factor determines a level of robustness of the one or more non-classified watermarked images (302); and
   performing, based upon the one or more non-classified watermarked images, a plurality of steps for the tampering detection, wherein the plurality of steps comprise:
   (i) obtaining one or more classified watermarked images, wherein the one or more classified watermarked images comprise one or more watermarked images classified by the CNN by implementing a forward pass CNN technique, and wherein the one or more classified watermarked images are obtained and classified upon passing the one or more non-classified watermarked images as an input into the CNN (303(i)); and
   (ii) determining an absence or a presence of the tampering in the one or more classified watermarked images by computing a difference of the one or more classified watermarked images and a product of the scaling factor and the random noise (303(ii)).

2. The method of claim 1, wherein the CNN is a multi-layered network with two output classes to identify the one or more classified watermarked images either as the non-tampered class of images or as the tampered class of images for determining the absence or the presence of the tampering.

3. The method of claim 1, wherein the step of extracting the watermark (or the random noise) comprises implementing a deep learning technique into the set of database images to obtain the one or more non-classified watermarked images.

4. The method of claim 1, wherein the random noise varies depending upon a manipulation in the one or more non-classified watermarked images, and wherein the variation in the random noise classifies the one or more non-classified watermarked images as the tampered class of images.

5. The method of claim 1, wherein the tampered class of images and the non-tampered class of images are labelled by the class name by implementing the forward pass CNN technique.

6. A system (100) for insertion of a watermark into images and tampering detection of the watermarked images based upon a Convolutional Neural Network (CNN) technique, the system (100) comprising:
   a memory (102) storing instructions;
   one or more communication interfaces (106); and
   one or more hardware processors (104) coupled to the memory (102) via the one or more communication interfaces (106), wherein the one or more hardware processors (104) are configured by the instructions to:
   perform, by the one or more hardware processors (104), a plurality of steps, wherein the plurality of steps comprise:
   (i) training a Convolutional Neural Network (CNN) (201), wherein the CNN (201) is trained to classify a set of database images (202) into a tampered class of images or a non-tampered class of images, wherein the non-tampered class of images comprise a sequence of random noise generated using a pseudo random number generator technique based upon the set of database images (202), and wherein the tampered class of images and the non-tampered class of images are labelled by a class name for identification; and
   (ii) extract a watermark (or a random noise), wherein the watermark (or the random noise) is extracted as a function of one or more parameters of the CNN (201), a label of the non-tampered class of images and one or more input images into which the random noise is inserted;
   obtain, based upon the extracted watermark, one or more non-classified watermarked images, wherein the one or more non-classified watermarked images are obtained by inserting the extracted watermark along with a scaling factor into the one or more input images either in a spatial domain or in a transform domain, and wherein the scaling factor determines a level of robustness of the one or more non-classified watermarked images; and
   perform, based upon the one or more non-classified watermarked images, a plurality of steps for the tampering detection, wherein the plurality of steps comprise:
   (i) obtain one or more classified watermarked images, wherein the one or more classified watermarked images comprise one or more watermarked images classified by the CNN (201) by implementing a forward pass CNN technique, and wherein the one or more classified watermarked images are obtained and classified upon passing the one or more non-classified watermarked images as an input into the CNN (201); and (ii) determine an absence or a presence of the tampering in the one or more classified watermarked images by computing a difference of the one or more classified watermarked images, and a product of the scaling factor and the random noise.

7. The system (100) of claim 6, wherein the CNN (201) is a multi-layered network with two output classes to identify the one or more classified watermarked images either as the non-tampered class of images or as the tampered class of images for determining the absence or the presence of the tampering.

8. The system (100) of claim 6, wherein the one or more hardware processors are configured to extract the watermark (or the random noise) by implementing a deep learning technique into the set of database images (202) to obtain the one or more non-classified watermarked images.

9. The system (100) of claim 6, wherein the random noise varies depending upon a manipulation in the one or more non-classified watermarked images, and wherein the variation in the random noise classifies the one or more non-classified watermarked images as the tampered class of images.

10. The system (100) of claim 6, wherein the tampered class of images and the non-tampered class of images are labelled by the class name by implementing the forward pass CNN technique.

11. One or more non-transitory machine readable information storage mediums comprising one or more instructions which when executed by one or more hardware processors cause:

performing, by one or more hardware processors, a plurality of steps, wherein the plurality of steps comprise:
 (i) training a Convolutional Neural Network (CNN), wherein the CNN is trained to classify a set of database images into a tampered class of images or a non-tampered class of images, wherein the non-tampered class of images comprise a sequence of random noise generated using a pseudo random number generator technique based upon the set of database images, and wherein the tampered class of images and the non-tampered class of images are labelled by a class name for identification (301(i)); and
 (ii) extracting a watermark (or a random noise), wherein the watermark (or the random noise) is extracted as a function of one or more parameters of the CNN, a label of the non-tampered class of images and one or more input images into which the random noise is inserted (301(ii));

obtaining, based upon the extracted watermark, one or more non-classified watermarked images, wherein the one or more non-classified watermarked images are obtained by inserting the extracted watermark along with a scaling factor into the one or more input images either in a spatial domain or in a transform domain, and wherein the scaling factor determines a level of robustness of the one or more non-classified watermarked images (302); and performing, based upon the one or more non-classified watermarked images, a plurality of steps for the tampering detection, wherein the plurality of steps comprise:
 (i) obtaining one or more classified watermarked images, wherein the one or more classified watermarked images comprise one or more watermarked images classified by the CNN by implementing a forward pass CNN technique, and wherein the one or more classified watermarked images are obtained and classified upon passing the one or more non-classified watermarked images as an input into the CNN (303(i)); and
 (ii) determining an absence or a presence of the tampering in the one or more classified watermarked images by computing a difference of the one or more classified watermarked images and a product of the scaling factor and the random noise (303(ii)).

12. The one or more non-transitory machine readable information storage mediums of claim 11, wherein the CNN is a multi-layered network with two output classes to identify the one or more classified watermarked images either as the non-tampered class of images or as the tampered class of images for determining the absence or the presence of the tampering.

13. The one or more non-transitory machine readable information storage mediums of claim 11, wherein the step of extracting the watermark (or the random noise) comprises implementing a deep learning technique into the set of database images to obtain the one or more non-classified watermarked images.

14. The one or more non-transitory machine readable information storage mediums of claim 11, wherein the random noise varies depending upon a manipulation in the one or more non-classified watermarked images, and wherein the variation in the random noise classifies the one or more non-classified watermarked images as the tampered class of images.

15. The one or more non-transitory machine readable information storage mediums of claim 11, wherein the tampered class of images and the non-tampered class of images are labelled by the class name by implementing the forward pass CNN technique.

* * * * *